United States Patent
Tanabe et al.

(10) Patent No.: US 9,450,532 B2
(45) Date of Patent: Sep. 20, 2016

(54) MOTOR CONTROL DEVICE AND MOTOR CONTROL SYSTEM

(71) Applicant: Mitsubishi Electric Corporation, Tokyo (JP)

(72) Inventors: Akira Tanabe, Tokyo (JP); Daisuke Goto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/781,346

(22) PCT Filed: Apr. 2, 2014

(86) PCT No.: PCT/JP2014/059717
§ 371 (c)(1),
(2) Date: Sep. 30, 2015

(87) PCT Pub. No.: WO2015/151242
PCT Pub. Date: Oct. 8, 2015

(65) Prior Publication Data
US 2016/0142001 A1    May 19, 2016

(51) Int. Cl.
*G01R 31/00* (2006.01)
*H02P 29/02* (2016.01)
*H02P 29/00* (2016.01)

(52) U.S. Cl.
CPC ............ *H02P 29/024* (2013.01); *H02P 29/00* (2013.01)

(58) Field of Classification Search
CPC .. G01R 31/00; H02P 29/024; H02P 29/2985
USPC .......... 318/255, 490, 265, 268, 400.21, 706; 340/648, 635
See application file for complete search history.

(56) References Cited

U.S. PATENT DOCUMENTS

| | | | | |
|---|---|---|---|---|
| 4,827,730 A | * | 5/1989 | Doi ...................... | G07C 5/0808 165/11.1 |
| 4,845,483 A | * | 7/1989 | Negishi .................. | G06K 15/12 340/12.16 |

(Continued)

FOREIGN PATENT DOCUMENTS

| JP | 2-17511 A | 1/1990 |
|---|---|---|
| JP | 3-118795 A | 5/1991 |

(Continued)

OTHER PUBLICATIONS

International Search Report for PCT/JP2014/059717 dated Jul. 1, 2014.

*Primary Examiner* — Rita Leykin
(74) *Attorney, Agent, or Firm* — Sughrue Mion, PLLC

(57) ABSTRACT

A motor control device includes: a control processing unit that controls driving of a motor based on a command signal input from a controller so as to command an operation of the motor and a detection signal which is a detection result of the operation of the motor; and an abnormality determining unit that detects an abnormality in the controller, the motor control device, and the motor based on the command signal, the detection signal, and a control signal generated in the motor control device and that determines a level of repeatability of the detected abnormality based on a predetermined criterion. The control processing unit transitions from a normal mode to a specific abnormality alarm mode when the abnormality determining unit determines that an specific abnormality having high repeatability has occurred.

12 Claims, 4 Drawing Sheets

(56) References Cited

U.S. PATENT DOCUMENTS

| | | | | |
|---|---|---|---|---|
| 5,293,196 | A * | 3/1994 | Kaneko | G03G 15/5075 358/400 |
| 5,739,649 | A * | 4/1998 | Akao | B60L 3/0023 318/139 |
| 6,406,119 | B1 * | 6/2002 | Cho | B41J 29/393 347/16 |
| 8,253,365 | B2 * | 8/2012 | Yeh | G01R 31/343 318/400.15 |
| 8,574,128 | B2 * | 11/2013 | Kimura | B60T 1/005 477/185 |
| 8,898,294 | B2 * | 11/2014 | Hansen | G06F 11/0748 709/224 |
| 2009/0146594 | A1 | 6/2009 | Nakano et al. | |
| 2014/0285131 | A1 * | 9/2014 | Sasaki | H02P 29/0088 318/490 |

FOREIGN PATENT DOCUMENTS

| | | |
|---|---|---|
| JP | 7-121232 A | 5/1995 |
| JP | 8-339217 A | 12/1996 |
| JP | 2000-347532 A | 12/2000 |
| JP | 2005-341692 A | 12/2005 |
| JP | 2008-263737 A | 10/2008 |
| JP | 2009-142049 A | 6/2009 |

* cited by examiner

FIG.3

| | ALARM | |
|---|---|---|
| DATE AND TIME OF OCCURRENCE | MESSAGE | ALARM STATE |
| 15:04 FEBRUARY 6, 2014 | □□□□ ABNORMALITY | SPECIFIC ALARM STATE |
| | | |
| | | |
| | | |
| | | |

FIG.4

| | ALARM | |
|---|---|---|
| DATE AND TIME OF OCCURRENCE | MESSAGE | ALARM STATE |
| 13:03 FEBRUARY 4, 2014 | ○○○○ ABNORMALITY | |
| | | |
| | | |
| | | |
| | | |

MOTOR CONTROL DEVICE AND MOTOR CONTROL SYSTEM

CROSS REFERENCE TO RELATED APPLICATIONS

This application is a National Stage of International Application No. PCT/JP2014/059717 filed Apr. 2, 2014, the contents of which are incorporated herein by reference in their entirety.

FIELD

The present invention relates to a motor control device and a motor control system.

BACKGROUND

In general, a motor control system that controls driving of industrial machinery includes a motor that applies power to a drive target in the industrial machinery, a motor control device that controls driving of the motor by applying appropriate electric power to the motor, a controller that generates a position control command for the motor and outputs the generated position control command to the motor control device, and a detector that detects position information of the motor and transmits the detected position information to the motor control device. The motor control device controls the driving of the motor by applying appropriately electric power to the motor based on information input from the controller and the detector.

In general, the controller and the motor control device include, for example, unit that monitors an internal control state and a unit that detects an abnormality of a communication state with an equipment connected thereto, in addition to functions associated with the drive control of the motor. These units have a protection function of cutting off the supply of power to the motor and generating an alarm to call an operator's attention when occurrence of an abnormality is detected during the driving of the motor.

However, the protection function is carried out only when an abnormality occurs. A source which is an underlying cause of the abnormality occurrence is not removed, but only an abnormal state releasing operation, that is, an alarm state reset process such as pressing of an alarm reset button and re-application of electric power, can be performed. When only the alarm state reset process is performed, the alarm history (history of occurrence of an abnormal state) is stored in the controller and the motor control device. However, since a source which is an underlying cause of the abnormality occurrence is not removed, there is a problem in that the same abnormality as the abnormality of which an alarm has been released may occur when the motor is driven again.

For example, the following techniques have been proposed as an operation of the motor control device when an abnormality occurs. For example, Patent Literature 1 discloses a plant monitoring system that ranks a detected abnormality and displays a countermeasure against an abnormality having high emergency. For example, Patent Literature 2 discloses a mobile object control device and a control method thereof in which codes indicating operation states of a robot are stored in advance, the operation of the robot is inhibited in the case of an important abnormality code, and this history is stored in a nonvolatile memory. In this case, the operation of the robot is inhibited depending on details in the nonvolatile memory even after a reset operation.

CITATION LIST

Patent Literature

Patent Literature 1: Japanese Patent Application Laid-Open No. H2-17511
Patent Literature 2: Japanese Patent Application Laid-Open No. H8-339217

SUMMARY

Technical Problem

However, in the technique disclosed in Patent Literature 1, an abnormality is ranked and then a countermeasure against only an abnormality having high emergency is displayed. Accordingly, a countermeasure against an abnormality having low emergency but high repeatability is not displayed. As a result, only releasing of an alarm state using re-application of electric power or the like in a state in which investigation of a cause of the abnormality occurrence is not completed can be easily performed. When an alarm state reset process is carelessly performed in a state in which the investigation of a cause of the abnormality occurrence is not completed and a source which is an underlying cause of the abnormality occurrence is not removed and the motor is driven again, there is a possibility that the same abnormality, erroneous operation, and the like will occur.

In the technique disclosed in Patent Literature 2, when an operation is once inhibited, a restoration-disabling message is displayed and a restoration command and the like are all ignored. Accordingly, even when an abnormality having low repeatability occurs, there is a problem in that a nonvolatile memory clearing process is necessary and a restoration operation requires time.

The present invention is made in consideration of the above-mentioned circumstances, and an object of the present invention is to provide a motor control device and a motor control system that can prevent occurrence of the same abnormality due to an easygoing release process on a specific abnormality having high repeatability and can easily perform a restoration process on an abnormality other than a specific abnormality having high repeatability.

Solution to Problem

In order to solve the aforementioned problems, a motor control device that is connected to a controller and a motor and that controls driving of the motor according to one aspect of the present invention is constructed to include: a control processing unit that controls the driving of the motor based on a command signal input from the controller so as to command an operation of the motor and a detection signal which is a detection result of the operation of the motor; and an abnormality determining unit that detects an abnormality in the controller, the motor control device, and the motor based on the command signal, the detection signal, and a control signal generated in the motor control device and that determines a level of repeatability of the detected abnormality based on a predetermined criterion, wherein, when a specific abnormality determined to have high repeatability according to the predetermined criterion has occurred, the control processing unit transitions from a normal mode in which the driving control of the motor is enabled to a specific abnormality alarm mode in which a control stop state in which the driving control of the motor is stopped is caused and in which releasing of the control stop state is disabled by a reset process.

Advantageous Effects of Invention

According to the present invention, it is possible to provide a motor control device and a motor control system that can prevent occurrence of the same abnormality due to an easygoing release process on a specific abnormality having high repeatability and can easily perform a restoration process on an abnormality other than a specific abnormality having high repeatability.

BRIEF DESCRIPTION OF DRAWINGS

FIG. 3 is a diagram illustrating an example of indication of occurrence information of a specific abnormality (specific alarm display) on a display unit.

FIG. 4 is a diagram illustrating an example of indication of occurrence information of an abnormality having low repeatability other than the specific abnormality (alarm display) on the display unit.

DESCRIPTION OF EMBODIMENTS

Hereinafter, a motor control device and a motor control system according to embodiments of the present invention will be described in detail with reference to the accompanying drawings. The present invention is not limited to the following techniques, but can be properly modified in various forms without departing from the gist of the present invention.

First Embodiment

Figure 1:
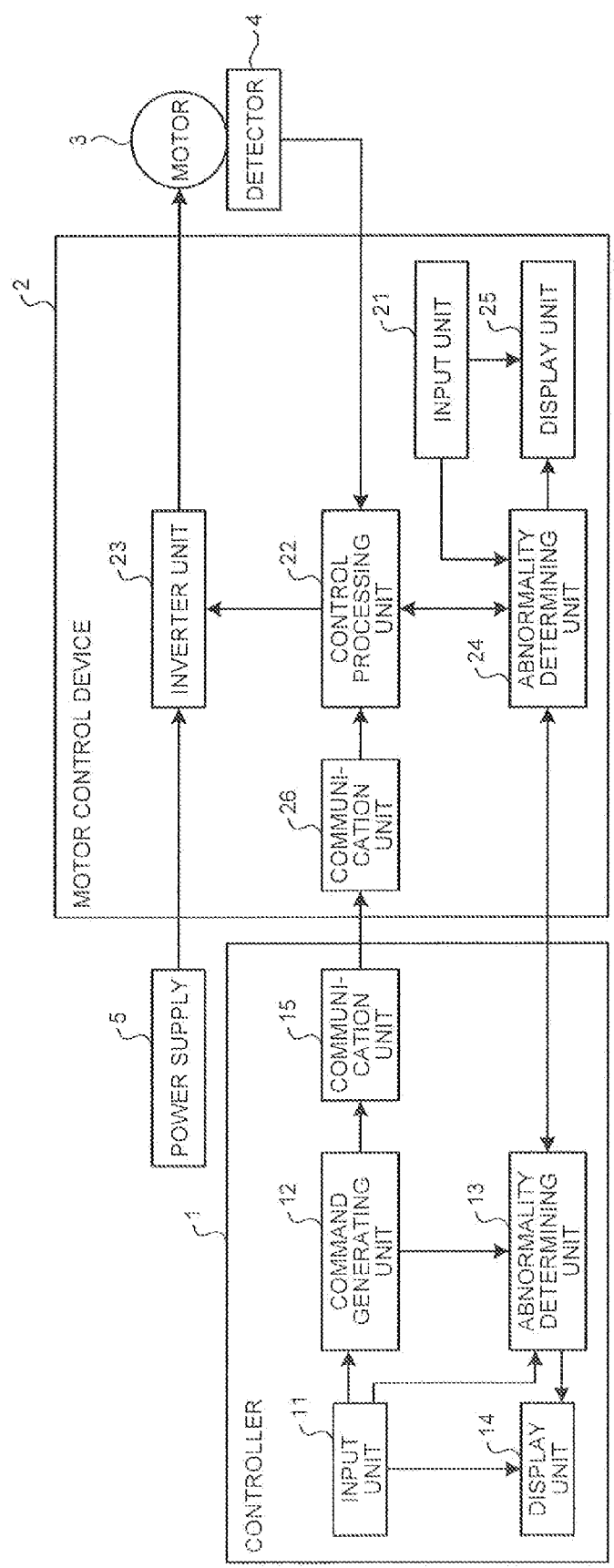
FIG. 1 is a block diagram illustrating the configuration of a motor control system according to a first embodiment of the present invention.

This embodiment relates to a motor control device and a motor control system that drive a motor of industrial machinery such as machine tools. FIG. 1 is a block diagram illustrating the configuration of the motor control system according to the first embodiment. The motor control system according to the first embodiment includes a controller 1, a motor control device 2, a motor 3, and a detector 4. The controller 1 and the motor control device 2 are connected to each other so as to communicate with each other by communication lines such as a communication network or an exclusive line. Similarly, the motor control device 2 and the detector 4 are connected to each other so as to communicate with each other by communication lines such as a communication network or an exclusive line.

The controller 1 generates a motor position command signal which is a position control command for the motor 3, which is necessary for causing the motor control device 2 to control the motor 3 so as to perform a desired operation, and other command signals and transmits the generated command signals to the motor control device 2. Details of the controller 1 will be described later.

The motor control device 2 controls driving of the motor 3 based on the motor position command signal input from the controller 1 and a detection signal (rotational angle information) which is a detection result of the operation of the motor 3 and which is input from the detector 4. That is, the motor control device 2 supplies appropriate electric power to the motor 3 such that the motor 3 operates to follow the motor position command signal. Details of the motor control device 2 will be described later.

The motor 3 is an actuator that converts the electric power supplied from the motor control device 2 into a rotational force of a motor shaft. The motor 3 drives a shaft of a machine (mechanical load) which is mechanically connected thereto by a linkage such as a coupling.

The detector 4 is an encoder which is mechanically connected to the motor 3, detects a rotational angle of the motor 3 which is an operation result of the motor 3, generates the detection signal of the motor 3 (rotational angle information of the motor 3), and outputs the detection signal to the motor control device 2.

Details of the controller 1 will be described below. The controller 1 includes an input unit 11, a command generating unit 12, an abnormality determining unit 13, a display unit 14, and a communication unit 15.

The input unit 11 is an interface used for an operator to input and set a variety of information for the controller 1, and various input devices such as a touch panel, a keyboard, and a pointing device are used as an example thereof. The input unit 11 may include an information reproducing device that reproduces information from a storage medium and a communication device to which information can be input from the outside by communication. An operator inputs and sets a motor operation condition, prepares and inputs a program for generating various signals, and the like using the input unit 11. Examples of the motor operation condition include parameters necessary for the motor control device 2 to control the motor 3 and operation conditions of the motor 3.

The command generating unit 12 generates a motor position command signal based on the motor operation condition input from the input unit 11 and outputs the generated motor position command signal to the motor control device 2. The command generating unit 12 also outputs the motor position command signal to the abnormality determining unit 13. When a motor stop signal which is stop instructing information for cutting off the supply of electric power to the motor 3 to stop the motor is input from the abnormality determining unit 13, the command generating unit 12 outputs the input motor stop signal to a control processing unit 22 of the motor control device 2 to be described later. When abnormality occurrence information or specific abnormality occurrence information is input from the abnormality determining unit 13, the command generating unit 12 also outputs the input information to the control processing unit 22 of the motor control device 2 to be described later.

The abnormality determining unit 13 monitors observation signals such as the motor operation condition input from the input unit 11, the motor position command signal input from the command generating unit 12, and a control signal generated inside the motor control device and detects an abnormality in the controller 1 based on information acquired from the observation signals. When occurrence of an abnormality is detected, the abnormality determining unit 13 has a protection function of giving an alarm to call an operator's attention and cutting off the supply of electric power to the motor 3 to stop the motor 3, if necessary, during driving of the motor.

That is, the abnormality determining unit 13 outputs abnormality occurrence information (abnormal state) to the display unit 14 of the controller 1 and a display unit 25 of the motor control device 2 to be described later so as to display details of the abnormality. Accordingly, the abnormality occurrence and the abnormality details in the controller 1 are notified to an operator. The abnormality determining unit 13 outputs a motor stop signal, which is stop instructing information for cutting off the supply of electric power to the motor 3 to stop the motor, to the command generating unit 12 depending on the details of the detected abnormality.

The abnormality determining unit 13 determines a level of repeatability of the detected abnormality based on a predetermined criterion. That is, the abnormality determining unit 13 determines whether the detected abnormality is a specific abnormality having high repeatability or an abnormality (abnormality having low repeatability), which is an abnormality different from the specific abnormality, other than a specific abnormality having high repeatability. As the predetermined criterion, information of the abnormality corresponding to the specific abnormality having high repeatability is stored, for example, as a list in the abnormality determining unit 13 in advance. The abnormality determining unit 13 determines whether the detected abnormality is the specific abnormality having high repeatability by referring to the list. The list may be stored in a place other than the abnormality determining unit 13 in the controller 1.

Here, examples of the specific abnormality having high repeatability in this description include an abnormality related to a process of supplying a current to the motor 3 and an abnormality related to a process of stopping the motor 3. Examples of the abnormality related to the process of supplying a current to the motor 3 include an abnormality in which the motor 3 is driven when the motor 3 has to be stopped (particularly, at the time of start) and an abnormality in which the motor 3 is not stopped but driven when the control of stopping the motor 3 is performed. Examples of the abnormality in which the motor 3 is driven when the motor 3 has to be stopped (particularly, at the time of start) include an abnormality of a start signal at the time of starting of the motor control system, an abnormality of the motor position command signal, and an abnormality of a power command signal to be described later. The abnormality determining unit 13 detects the abnormalities in the controller 1 among the above-mentioned abnormalities.

When the detected abnormality is an abnormality having low repeatability, the abnormality determining unit 13 generates and outputs occurrence information of the abnormality to the command generating unit 12. On the other hand, when the detected abnormality is the specific abnormality having high repeatability, the abnormality determining unit 13 generates and outputs occurrence information of the specific abnormality to the command generating unit 12.

When the detected abnormality is the specific abnormality having high repeatability, the abnormality determining unit 13 outputs the occurrence information of the specific abnormality (abnormal state) to the display unit 14 of the controller 1 and the display unit 25 of the motor control device 2 to be described later so as to display occurrence of the specific abnormality (specific alarm display). Accordingly, the occurrence of the specific abnormality and the abnormality details in the controller 1 can be notified to an operator to call the operator's attention.

The display unit 14 is a display unit that displays a display screen, an alarm display screen, and a variety of information including input information from the outside in the processes of the controller 1. The display unit 14 may be disposed outside the controller 1 to be connected to the controller 1.

The display unit 14 is actuated in a normal display mode in which normal display is performed when the motor is normally controlled. When the occurrence information of an abnormality is input, the display unit 14 transitions to an abnormality alarm display mode in which occurrence of an abnormality is indicated by displaying the occurrence information of the abnormality as an alarm display. When the occurrence information of a specific abnormality is input, the display unit 14 transitions to a specific abnormality alarm display mode in which the occurrence of the specific abnormality is displayed by displaying the occurrence information of the specific abnormality as an alarm display.

That is, the display mode of the display unit 14 transitions depending on the transition of a mode of the control processing unit 22 to be described later. That is, when the mode of the control processing unit 22 is a normal mode, the display unit 14 transitions to a normal display mode. When the mode of the control processing unit 22 is the abnormality alarm mode, the display unit 14 transitions to an abnormality alarm display mode. When the mode of the control processing unit 22 is the specific abnormality alarm mode, the display unit 14 transitions to a specific abnormality alarm display mode.

The normal display mode is a display mode in which a normal control screen, a monitoring screen, and the like can be displayed. The abnormality alarm display mode is a display mode in which occurrence information of the specific abnormality or occurrence information of an abnormality, which is different from the specific abnormality, other than the specific abnormality is displayed. The abnormality alarm display mode is a mode in which display of the occurrence information of the specific abnormality or the occurrence information of an abnormality other than the specific abnormality is released by performing a reset process on the display unit 14 (or the device including the display unit 14) and can be restored to the normal display mode. The abnormality alarm display mode transitions to the normal display mode by performing a reset process on the display unit 14 (or the device including the display unit 14). The display unit 14 in the abnormality alarm mode transitions to a stop mode when the power supply of the display unit 14 (or the device including the display unit 14) is turned off.

The specific abnormality alarm display mode is a display mode in which occurrence information of the specific abnormality is displayed. The specific abnormality alarm display mode is a mode in which restoration to the normal display mode is disabled by releasing the display of the occurrence information of the specific abnormality by the reset process on the display unit 14 (or the device including the display unit 14). The specific abnormality alarm display mode cannot transition to the normal display mode even when the reset process or the like is performed on the display unit 14 (or the device including the display unit 14). The specific abnormality alarm display mode transitions to the abnormality alarm display mode only when the specific abnormality releasing process is performed on the display unit 14. The display unit 14 in the specific abnormality alarm mode transitions to the stop mode when the power supply of the display unit 14 (or the device including the display unit 14) is turned off.

An example of the specific abnormality releasing process on the display unit 14 is an input of a mode transition command signal to the display unit 14. As a method of inputting the mode transition command signal to the display unit 14, for example, as will be described later, the mode transition command signal input to the control processing unit 22 may also be input to the display unit 14 as the input of the mode transition command signal to the display unit 14. When the mode transition command signal is input to the control processing unit 22, the control processing unit 22 may output the mode transition command signal for the display unit to the display unit.

The modes of the display unit 14 are described above, but a display unit 25 of the motor control device 2 to be described later also has a function related to the modes.

The communication unit 15 is an information input and output unit that inputs and outputs a variety of information to and from the outside, for example, via a communication line such as an Internet line or an exclusive line.

Details of the motor control device 2 will be described below. The motor control device 2 includes an input unit 21, a control processing unit 22, an inverter unit 23, an abnormality determining unit 24, a display unit 25, and a communication unit 26.

The input unit 21 is an interface used for an operator to input and set a variety of information for the motor control device 2, and various input devices such as a touch panel, a keyboard, and a pointing device are used as an example thereof. The input unit 21 may include an information reproducing device that reproduces information from a storage medium and a communication device to which information can be input from the outside by communication. An operator inputs and sets a motor operation condition, prepares and inputs a program for generating various signals, and the like using the input unit 21.

The control processing unit 22 generates a power command signal for supplying appropriate electric power necessary for driving the motor 3 to the motor 3 and outputs the power command signal to the inverter unit 23. The control processing unit 22 calculates electric power to be supplied to the motor 3 based on the motor position command signal input from the controller 1 and a detection signal (rotational angle information of the motor 3) input from the detector 4 and generates the power command signal. The control processing unit 22 at its activation starting time transitions from the stop mode to the normal mode. The normal mode is a mode in which a shaft of a machine (mechanical load) can be driven by an input through the input unit 21 by an operator and the driving of the motor 3 can be controlled by outputting the power command signal to the inverter unit 23.

When an abnormality occurs in the motor control system and the motor stop signal is input from the command generating unit 12 of the controller 1 or the abnormality determining unit 24 of the motor control device 2, the control processing unit 22 stops the output of the power command signal to stop the driving of the motor 3 (alarm state).

When occurrence information of an abnormality is input from the command generating unit 12 of the controller 1 or the abnormality determining unit 24 of the motor control device 2, the control processing unit 22 transitions to the abnormality alarm mode. The abnormality alarm mode is a mode in which the output of the power command signal from the control processing unit 22 to the inverter unit 23 to stop the driving of the motor 3 until the reset process is performed on the motor control device 2 (or the entire motor control system).

The abnormality alarm mode is a mode in which the reset process can be performed. The control processing unit 22 in the abnormality alarm mode transitions to the normal mode in which the driving of the motor 3 can be controlled by outputting the power command signal to the inverter unit 23 when the reset process is performed on the motor control device 2 (or the entire motor control system). The reset process is performed, for example, by a process of pressing a reset button of a device in which the abnormality has occurred or a process of re-applying electric power. The control processing unit 22 in the abnormality alarm mode transitions to the stop mode when the power supply of the motor control device or the motor control system is turned off.

When occurrence information of a specific abnormality is input from the command generating unit 12 of the controller 1 or the abnormality determining unit 24 of the motor control device 2, the control processing unit 22 transitions to the specific abnormality alarm mode. The specific abnormality alarm mode is a mode in which the reset process is disabled. The control processing unit 22 in the specific abnormality alarm mode cannot transition to the normal mode even when the reset process or the like is performed on the motor control device 2 (or the entire motor control system). The control processing unit 22 in the specific abnormality alarm mode transitions to the abnormality alarm mode only when the specific abnormality releasing process is performed on the control processing unit 22.

An example of the specific abnormality releasing process on the control processing unit 22 is an input of the mode transition command signal to the control processing unit 22. For example, the method of inputting the mode transition command signal to the control processing unit 22 may be an input of a predetermined specific release code to the input unit 21 of the motor control device 2 or the input unit 11 of the controller 1 or may be a hardware operation such as pressing of plural buttons. When the specific abnormality releasing process is performed on the input unit 11 or the input unit 21, for example, the mode transition command signal is output from the input unit 11 or the input unit 21 and is input to the control processing unit 22. The specific release code may be input as the mode transition command signal to the control processing unit 22 without any change.

When the mode transition command signal is input, the control processing unit 22 transitions from the specific abnormality alarm mode to the abnormality alarm mode. The control processing unit 22 having transitioned to the abnormality alarm mode can transition to the normal mode by performing the reset process on the motor control device 2 (or the entire motor control system). When the power supply of the motor control device or the motor control system is turned off, the control processing unit 22 in the specific abnormality alarm mode transitions to the stop mode.

The inverter unit 23 supplies suitable electric power necessary for driving the motor 3 to the motor 3 based on the power command signal input from the control processing unit 22. That is, the inverter unit 23 converts DC power supplied from a power supply 5 into AC power of arbitrary frequency and voltage using a well-known method and supplies the AC power to the motor 3. Accordingly, the motor 3 is rotationally driven.

The abnormality determining unit 24 monitors the observation signals such as the motor position command signal input from the command generating unit 12 of the controller 1, the detection signal output from the detector 4, and the control signal generated in the motor control device and detects an abnormality in the controller 1, the motor control device 2, and the motor 3 based on the observation signals. when occurrence of an abnormality is detected, the abnormality determining unit 24 has a protection function of giving an alarm to call an operator's attention and cutting off the supply of electric power to the motor 3 during the driving of the motor.

That is, when an abnormality is detected, the abnormality determining unit 24 outputs occurrence information of the abnormality (abnormal state) to the display unit 25 of the motor control device 2 and the display unit 14 of the controller 1 so as to display details of the abnormality (alarm state). Accordingly, the occurrence of the abnormality in the motor control system and the details of the abnormality are notified to the operator. The abnormality determining unit 24 outputs a motor stop signal which is instruction information for cutting off the supply of electric power to the motor 3 to stop the motor to the control processing unit 22 in accordance with the details of the detected abnormality.

The abnormality determining unit 24 determines a level of repeatability of the detected abnormality based on a predetermined criterion. That is, the abnormality determining unit 24 determines whether the detected abnormality is a specific abnormality having high repeatability or an abnormality (abnormality having low repeatability) other than the specific abnormality having high repeatability. As the predetermined criterion, information of the abnormality corresponding to the specific abnormality having high repeatability is stored, for example, as a list in the abnormality determining unit 24 in advance. The abnormality determining unit 24 determines whether the detected abnormality is the specific abnormality having high repeatability by referring to the list. The list may be stored in a place other than the abnormality determining unit 24 in the motor control device 2.

When the detected abnormality is an abnormality having low repeatability, the abnormality determining unit 24 generates and outputs occurrence information of the abnormality to the control processing unit 22. On the other hand, when the detected abnormality is the specific abnormality having high repeatability, the abnormality determining unit 24 generates and outputs occurrence information of the specific abnormality to the control processing unit 22.

When the detected abnormality is the specific abnormality having high repeatability, the abnormality determining unit 24 outputs the occurrence information of the specific abnormality (abnormal state) to the display unit 25 of the motor control device 2 and the display unit 14 of the controller 1 so as to display occurrence of the specific abnormality (alarm state). Accordingly, the occurrence of the specific abnormality and the abnormality details in the motor control system can be notified to an operator to call the operator's attention.

The display unit 25 is a display unit that displays a display screen, an alarm display screen, and a variety of information including input information from the outside in the processes of the motor control device 2. The display unit 25 may be disposed outside the motor control device 2 to be connected to the motor control device 2. The display unit 25 also has the function related to the modes in the display unit 14.

The communication unit 26 is an information input and output unit that inputs and outputs a variety of information to and from the outside, for example, via a communication line such as an Internet line or an exclusive line. Transmission of information between the controller 1 and the motor control device 2 is performed via a main communication route passing through the communication unit 15 of the controller 1 and the communication unit 26 of the motor control device 2.

A sub communication route (communication line) other than the main communication route may be disposed between the controller 1 and the motor control device 2. For example, a sub communication route directly connecting the abnormality determining unit 13 of the controller 1 and the abnormality determining unit 24 of the motor control device 2 so as to communication with each other may be disposed. Accordingly, even when communication failure occurs in the main communication route passing through the communication units, information can be transmitted between the abnormality determining unit 13 of the controller 1 and the abnormality determining unit 24 of the motor control device 2 via the sub communication route.

Figure 2:
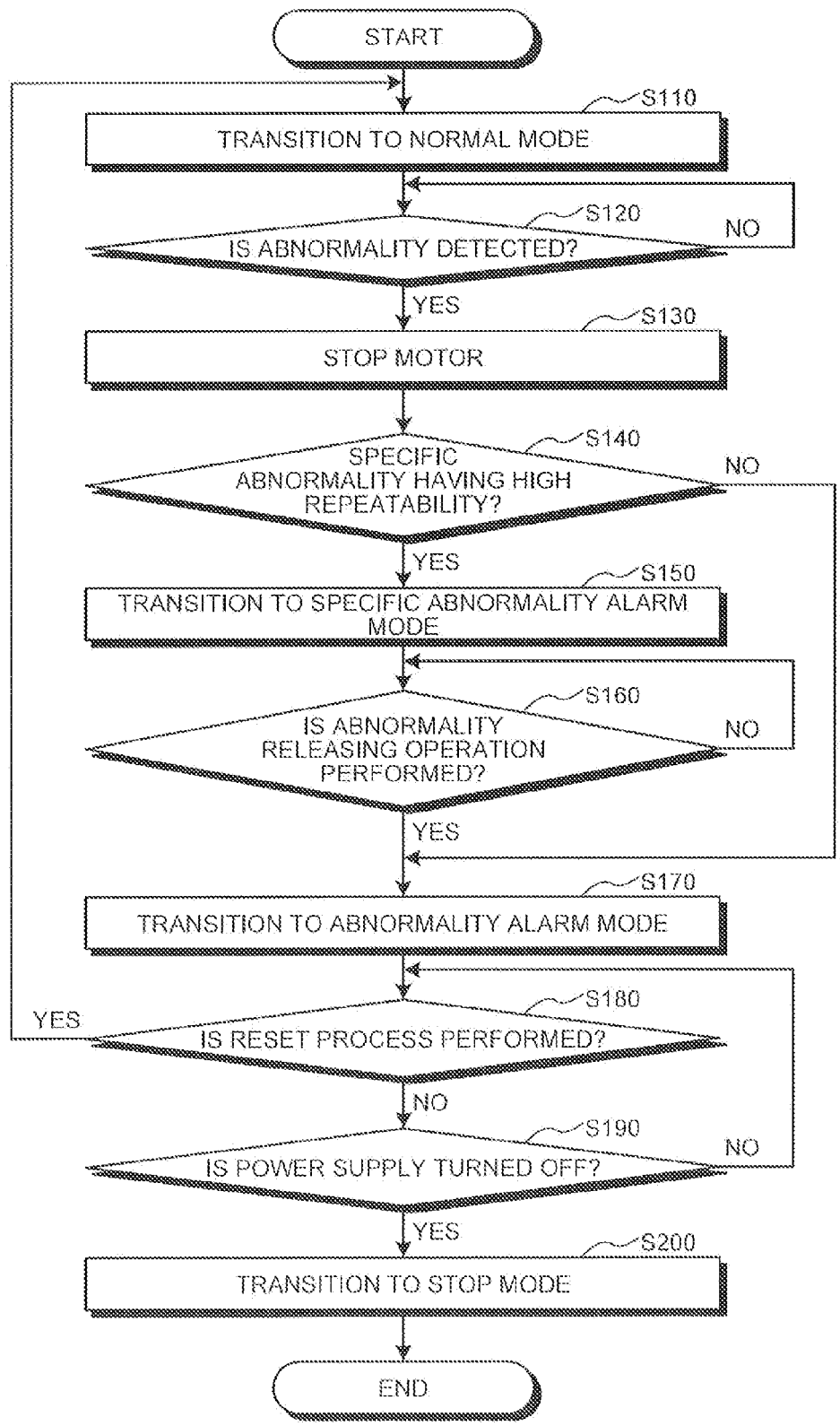
FIG. 2 is a flowchart illustrating a process flow of an alarm state releasing process when an abnormality is detected in the motor control system according to the first embodiment of the present invention.

An alarm state releasing process when an abnormality is detected in the motor control system according to the first embodiment having the above-mentioned configuration will be described below. FIG. 2 is a flowchart illustrating a process flow of the alarm state releasing process when an abnormality is detected in the motor control system according to the first embodiment. In FIG. 2, the process flow is illustrated with respect to the modes of the control processing unit 22. In the following description, it is assumed that the detected abnormality is an abnormality in which it is necessary to stop the motor 3.

When the power supply is turned on and the motor control system is started, the control processing unit 22 of the motor control device 2 transitions from the stop mode to the normal mode (step S110). The display unit 14 of the controller 1 and the display unit 25 of the motor control device 2 transition from the stop mode to the normal display mode. When the motor 3 is controlled by the motor control system, a motor operation condition is input from the input unit 11 of the controller 1 by an operator. The command generating unit 12 of the controller 1 generates a motor position command signal based on the motor operation condition input from the input unit 11 and outputs the motor position command signal to the control processing unit 22 of the motor control device 2. The command generating unit 12 also outputs the motor position command signal to the abnormality determining unit 13 of the controller 1.

After the motor control system is started, the abnormality determining unit 24 of the motor control device 2 monitors the observation signals such as the motor position command signal input from the command generating unit 12 of the controller 1, the detection signal output from the detector 4, and the control signal generated in the motor control device and determines whether an abnormality has occurred in the motor control system (step S120). When an abnormality is not detected (No in step S120), the abnormality determining unit 24 of the motor control device 2 continues to monitor the observation signals by repeatedly performing the process of step S120.

On the other hand, when an abnormality is detected (Yes in step S120), the abnormality determining unit 24 of the motor control device 2 generates and outputs a motor stop signal to the control processing unit 22. The occurrence information of the abnormality may be displayed on any one of the display unit 14 of the controller 1 and the display unit 25 of the motor control device 2.

When the motor stop signal is input from the abnormality determining unit 24 of the motor control device 2, the control processing unit 22 stops the output of the power command signal to stop the driving of the motor 3 (step S130).

Then, the abnormality determining unit 24 of the motor control device 2 determines the level of repeatability of the detected abnormality based on a predetermined criterion. That is, the abnormality determining unit 24 determines whether the detected abnormality is a specific abnormality having high repeatability or an abnormality (abnormality having low repeatability) other than the specific abnormality having high repeatability based on the predetermined criterion (step S140).

When the detected abnormality is the specific abnormality having high repeatability (Yes in step S140), the abnormality determining unit 24 of the motor control device 2 generates occurrence information of the specific abnormality and outputs the occurrence information of the specific abnormality to the display unit 14 of the controller 1 and the display unit 25 of the motor control device 2 to display the occurrence information (specific alarm display). Accordingly, the occurrence of the abnormality in the motor control system and the details of the abnormality are notified to the operator to call the operator's attention. The display unit 14 of the controller 1 and the display unit 25 of the motor control device 2 transition from the normal display mode to the specific abnormality alarm display mode.

An alarm display of all abnormalities is displayed on the display unit 14 of the controller 1 and the display unit 25 of the motor control device 2, but the indication of occurrence of the specific abnormality (specific alarm display) is performed in a manner other than the display of an abnormality having low repeatability other than the specific abnormality. The indication of the occurrence of the specific abnormality is performed distinctly, for example, by display of an additional message or colored display of an alarm display. Accordingly, the occurrence of the specific abnormality having high repeatability in the motor control system and the details of the abnormality can be clearly notified to the operator, thereby more effectively calling the operator's attention to a solution to a source which is an underlying cause.

FIG. 3 is a diagram illustrating an example of the display of the occurrence information of the specific abnormality (specific alarm display) on the display unit 14 of the controller 1 and the display unit 25 of the motor control device 2. FIG. 4 is a diagram illustrating an example of the indication of occurrence information of an abnormality having low repeatability other than the specific abnormality (alarm display) on the display unit 14 of the controller 1 and the display unit 25 of the motor control device 2. In the display illustrated in FIG. 3, an additional message indicating a specific alarm state due to occurrence of the specific abnormality is displayed in comparison with the display illustrated in FIG. 4. The occurrence information of the specific abnormality may be displayed on any one of the display unit 14 of the controller 1 and the display unit 25 of the motor control device 2.

When the detected abnormality is the specific abnormality having high repeatability, the abnormality determining unit 24 of the motor control device 2 outputs the occurrence information of the specific abnormality to the control processing unit 22. When the occurrence information of the specific abnormality is input from the abnormality determining unit 24 of the motor control device 2, the control processing unit 22 transitions from the normal mode to the specific abnormality alarm mode (step S150).

Then, the control processing unit 22 monitors whether the specific abnormality releasing process can be observed and determines whether the specific abnormality releasing process has been performed (step S160). That is, the control processing unit 22 determines whether an input of the mode transition command signal from the input unit 11 of the controller 1 or the input unit 21 of the motor control device 2 is present. The specific abnormality releasing process is performed by the operator based on the display details on the display unit 14 of the controller 1 and the display unit 25 of the motor control device 2.

When the specific abnormality releasing process is performed on the control processing unit 22, that is, when the mode transition command signal is input to the control processing unit 22 (Yes in step S160), the control processing unit 22 transitions from the specific abnormality alarm mode to the abnormality alarm mode (step S170). When the specific abnormality releasing process is performed on the display unit 14 and the display unit 25, that is, when the mode transition command signal is input to the display unit 14 and the display unit 25, the display unit 14 and the display unit 25 transitions from the specific abnormality alarm display mode to the abnormality alarm display mode (step S170).

When it is determined in step S140 that the detected abnormality is not the specific abnormality having high repeatability (No in step S140), the abnormality determining unit 24 of the motor control device 2 generates and outputs occurrence information of the abnormality to the control processing unit 22. When the occurrence information of the abnormality is input from the abnormality determining unit 24 of the motor control device 2, the control processing unit 22 transitions from the normal mode to the abnormality alarm mode (step S170).

When the detected abnormality is not the specific abnormality having high repeatability (No in step S140), the abnormality determining unit 24 of the motor control device 2 outputs the occurrence information of the abnormality to the display unit 14 of the controller 1 and the display unit 25 of the motor control device 2 so as to display the occurrence information (alarm display). Accordingly, the occurrence of the abnormality in the motor control system and the details of the abnormality are notified to the operator to call the operator's attention. The display unit 14 of the controller 1 and the display unit 25 of the motor control device 2 transition from the normal display mode to the abnormality alarm display mode.

Then, the control processing unit 22 determines whether the reset process has been performed on the motor control device 2 (or the entire motor control system) (step S180). If the reset process has been performed (Yes in step S180), the control processing unit 22 transitions from the abnormality alarm mode to the normal mode and the motor 3 can be driven by the motor control device 2 (step S110). If the reset process has been performed on the motor control system, the display unit 14 of the controller 1 and the display unit 25 of the motor control device 2 transition from the abnormality alarm display mode to the normal display mode (step S110).

On the other hand, when the reset process has not been performed (No in step S180), the control processing unit 22 determines whether a power supply cutting-off process (power supply turning-off) of the motor control device 2 or the motor control system has been performed (step S190).

If the power supply cutting-off process (power supply turning-off) of the motor control device 2 or the motor control system has been performed (Yes in step S190), the control processing unit 22 transitions to the stop mode and the driving control process of the motor 3 ends (step S200). The display unit 14 of the controller 1 and the display unit 25 of the motor control device 2 transition to the stop mode. On the other hand, if the power supply cutting-off process (power supply turning-off) of the motor control device 2 has not been performed (No in step S190), the control processing unit 22 determines whether the reset process has been performed in step S180 again.

On the other hand, when it is determined in step S160 that the specific abnormality releasing process has not been performed, that is, if an input of the mode transition command signal is not present (No in step S160), the control processing unit 22 continues to monitor whether the specific abnormality releasing process can be observed by repeatedly performing the process of step S160.

In the above description, the driving of the motor 3 is stopped when the motor stop signal is input to the control processing unit 22, but it can be arranged such that the driving of the motor 3 is stopped when the occurrence information of an abnormality or the occurrence information of the specific abnormality is input to the control processing unit 22.

Figure 5:
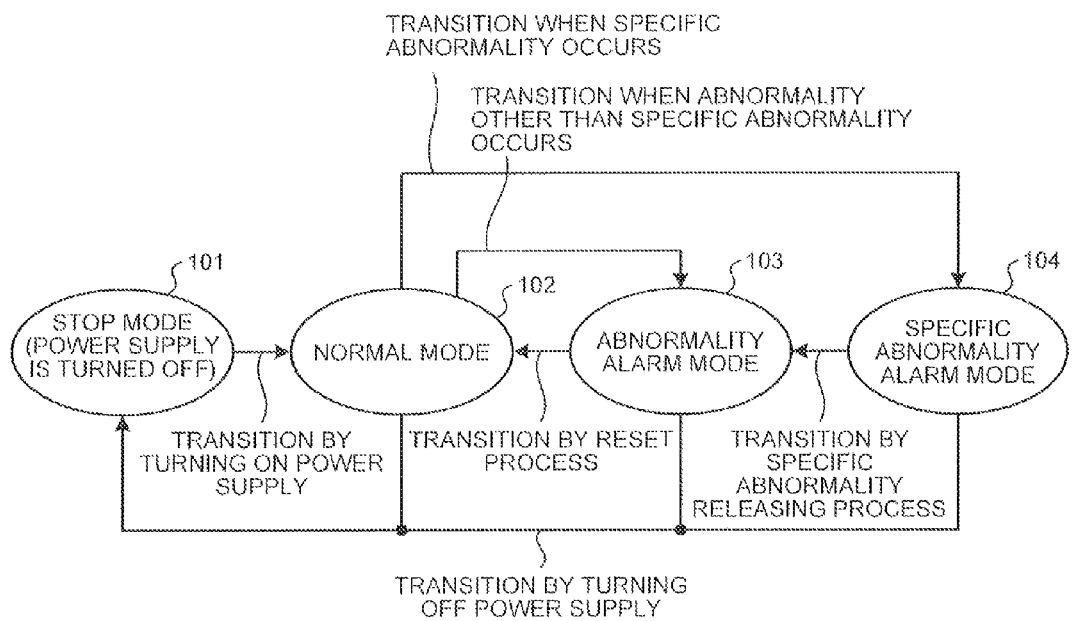
FIG. 5 is a diagram illustrating mode transition in a control processing unit of the motor control system according to the first embodiment of the present invention.

FIG. 5 is a diagram illustrating mode transition of the control processing unit 22 of the motor control system according to the first embodiment. The control processing unit 22 is started from the stop mode 101 and transitions to the normal mode 102 by turning on the power supply (power supply turning-on).

When the abnormality determining unit 13 or the abnormality determining unit 24 determines that an abnormality (abnormality having low repeatability) other than the specific abnormality having high repeatability has occurred during the driving of the motor 3, the control processing unit 22 stops the driving of the motor 3 and transitions from the normal mode 102 to the normal abnormality alarm mode 103. In the abnormality alarm mode 103, the abnormal state is notified to the operator, for example, through the display unit 25. The transition from the abnormality alarm mode 103 to the normal mode 102 is performed only when the reset process is performed.

When the abnormality determining unit 13 or the abnormality determining unit 24 determines that the specific abnormality having high repeatability has occurred during the driving of the motor 3, the control processing unit 22 stops the driving of the motor 3 and transitions from the normal mode 102 to the specific abnormality alarm mode 104 other than the abnormality alarm mode 103. In the specific abnormality alarm mode 104, how the abnormal state is like is notified to the operator, for example, through the display unit 25. The transition from the specific abnormality alarm mode 104 to the normal abnormality alarm mode 103 is performed only when the specific abnormality releasing process is performed by the operator.

That is, when the specific abnormality having high repeatability occurs, the control processing unit 22 transitions to the specific abnormality alarm mode 104. Accordingly, even when the reset process is performed on the motor control device 2 (or the entire motor control system), the control processing unit 22 does not accept the reset process. As a result, it is possible to more effectively call the operator's attention when the specific abnormality having high repeatability has occurred, and thus to prevent the alarm-state release through an easygoing reset process in a state in which the investigation of the cause of the abnormality occurrence has not been completed and a source which is an underlying cause of the abnormality occurrence has not been removed.

In any of the specific abnormality alarm mode 104, the abnormality alarm mode 103, and the normal mode 102, the control processing unit 22 transitions to the stop mode 101 when the power supply cutting-off process (power supply turning-off) of the motor control device 2 or the motor control system is performed.

The transition of the mode of the control processing unit 22 is described above, but the mode of the display unit 14 and the display unit 25 also transitions with the transition of the mode of the control processing unit 22. That is, when the mode of the control processing unit 22 is the normal mode, the display unit 14 is in the normal display mode. When the mode of the control processing unit 22 is the abnormality alarm mode, the display unit 14 is in the abnormality alarm display mode. When the mode of the control processing unit 22 is the specific abnormality alarm mode, the display unit 14 is in the specific abnormality alarm display mode.

That is, when the specific abnormality having high repeatability occurs, the display unit 14 and the display unit 25 transition to the specific abnormality alarm display mode. Accordingly, even when the reset process is performed on the display unit (or the device including the display unit), the display unit 14 and the display unit 25 do not accept the reset process. As a result, it is possible to more effectively call the operator's attention when the specific abnormality having high repeatability occurs and thus to prevent the alarm-state release through an easygoing reset process in a state in which the investigation of the cause of the abnormality occurrence has not been completed and a source which is an underlying cause of the abnormality occurrence has not been removed.

Figure 6:
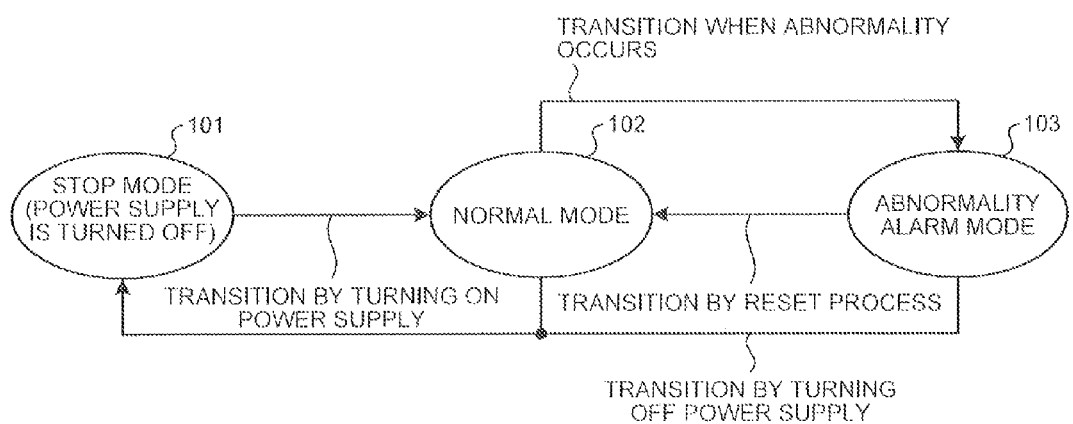
FIG. 6 is a diagram illustrating mode transition in a control processing unit of a motor control system according to a comparative example.

FIG. 6 is a diagram illustrating mode transition of a control processing unit of a motor control system according to a comparative example in which the control processing unit of a motor control device does not have the specific abnormality alarm mode. In FIG. 6, the same elements as illustrated in FIG. 5 are referenced by the same reference numerals as illustrated in FIG. 5.

The control processing unit according to the comparative example is started from the stop mode 101 and transitions to the normal mode 102 when the power supply is turned on (power supply turning-on). When the abnormality determining unit of the motor control device determines that an abnormality has occurred during the driving of the motor, the control processing unit stops the driving of the motor and transitions from the normal mode 102 to the normal abnormality alarm mode 103. In the abnormality alarm mode 103, the abnormal state is notified to the operator, for example, through the display unit.

When the operator performs the reset process in the abnormality alarm mode 103, the abnormality alarm mode 103 transitions to the normal mode 102 again. Here, the reset process is performed, for example, by pressing a reset button disposed in the input unit of the motor control device. In any mode of the abnormality alarm mode 103 and the normal mode 102, the control processing unit transitions to the stop mode 101 when the power supply cutting-off process (power supply turning-off) of the motor control device or the motor control system is performed.

In the motor control system according to this comparative example, since abnormalities are not classified, the control processing unit transitions from the normal mode 102 to the normal abnormality alarm mode 103 when any abnormality occurs. Accordingly, even when the specific abnormality having high repeatability occurs, the control processing unit transitions from the normal mode 102 to the normal abnormality alarm mode 103. Accordingly, when the reset process is performed, the control processing unit can transition to the normal mode 102. When an easygoing reset process is performed to re-drive the motor in a state in which the investigation of the cause of the abnormality occurrence has not been completed and a source which is an underlying cause of the abnormality occurrence has not been removed, there is a possibility that the same abnormality, erroneous operation, or the like will occur.

On the other hand, in the motor control system according to the first embodiment, when it is determined that the specific abnormality having high repeatability has occurred, the control processing unit 22 transitions to the specific abnormality alarm mode 104 in which the reset process is disabled. The transition from the specific abnormality alarm mode 104 to the normal abnormality alarm mode 103 is performed only when the specific abnormality releasing process is performed by the operator.

In the motor control system according to the first embodiment, the motor 3 can be safely and easily stopped until the specific abnormality releasing process is completed. In the motor control system according to the first embodiment, the alarm display on the display unit 14 and the display unit 25 cannot be released until the specific abnormality releasing process is completed. Accordingly, it is possible to more effectively call the operator's attention when the specific abnormality having high repeatability occurs and thus to prevent the alarm state release through an easygoing reset process in a state in which the investigation of the cause of the abnormality occurrence has not been completed and a source which is an underlying cause of the abnormality occurrence has not been removed. As a result, it is possible to easily prevent occurrence of the same specific abnormality having high repeatability due to the easygoing reset process, uncontrollable error of machinery due to the specific abnormality, and like.

In the motor control system according to the first embodiment, when it is determined that an abnormality (abnormality having low repeatability) other than the specific abnormality having high repeatability has occurred, the control processing unit 22 transitions from the normal mode 102 to the normal abnormality alarm mode 103. The transition from the abnormality alarm mode 103 to the normal mode 102 is performed when the reset process is performed. In the motor control system according to the first embodiment, the control processing unit can be restored to the normal mode 102 by only the reset process in the case of an abnormality (abnormality having low repeatability) other than the specific abnormality having high repeatability. Accordingly, it is possible to easily perform the restoration process to the normal mode 102 in the case of an abnormality (abnormality having low repeatability) other than the specific abnormality having high repeatability. The display unit can also be restored to the normal display mode by only the reset process in the case of an abnormality (abnormality having low repeatability) other than the specific abnormality having high repeatability. Accordingly, it is possible to easily perform the restoration process to the normal display mode in the case of the abnormality (abnormality having low repeatability) other than the specific abnormality having high repeatability.

In FIG. 5, it is assumed that the mode of the control processing unit 22 transitions from the stop mode 101 to the normal mode 102 when the power supply of the motor control device 2 is turned on. For example, in the specific abnormality alarm mode 104, the control processing unit 22 may store information of the specific abnormality alarm mode (for example, occurrence information of the specific abnormality) in a nonvolatile memory (not illustrated) of the motor control device 2. In this case, for example, when the power supply of the motor control device 2 is once turned off and is then turned on again, the control processing unit 22 acquires the information recorded on the nonvolatile memory. When the information of the specific abnormality alarm mode is stored in the nonvolatile memory, the control processing unit 22 transitions from the stop mode 101 to the specific abnormality alarm mode 104. Accordingly, while the specific abnormality releasing process is not performed, the control processing unit 22 does not transition to the normal mode 102 but transitions to the specific abnormality alarm mode 104 even by turning on the power supply. The control processing unit 22 erases the information of the specific abnormality alarm mode stored in the nonvolatile memory when the control processing unit transitions from the specific abnormality alarm mode 104 to the abnormality alarm mode 103.

As described above, in the first embodiment, it is possible to prevent the easygoing release of the alarm state by an operator in the case of the specific abnormality having high repeatability and thus to prevent the same abnormality from occurring again or sporadically. In the case of an abnormality (abnormality having low repeatability) other than the specific abnormality having high repeatability, it is possible to easily release the alarm state. As a result, according to the first embodiment, it is possible to achieve compatibility of calling the operator's attention and maintaining the workability at the time of occurrence of an abnormality.

Second Embodiment

In the first embodiment, the case in which the abnormality determining unit 24 of the motor control device 2 monitors the observation signals and determines whether an abnormality has occurred in the motor control system is described. In a second embodiment, a case in which the abnormality determining unit 13 of the controller 1 in the motor control system according to the first embodiment monitors the observation signals such as the motor position command signal and the control signal generated in the controller 1 and determines whether an abnormality has occurred in the motor control system will be described with reference to the flowchart illustrated in FIG. 2. The entire flow of the alarm state releasing process when an abnormality is detected in the second embodiment is the same as in the first embodiment.

When the motor control system is started (when the power supply is turned on), the control processing unit 22 of the motor control device 2 transitions from the stop mode to the normal mode (step S110). The display unit 14 of the controller 1 and the display unit 25 of the motor control device 2 transition from the stop mode to the normal display mode. When the motor 3 is controlled by the motor control system, a motor operation condition is input from the input unit 11 of the controller 1 by an operator. The command generating unit 12 of the controller 1 generates a motor position command signal based on the motor operation condition input from the input unit 11 and outputs the motor position command signal to the control processing unit 22 of the motor control device 2. The command generating unit 12 also outputs the motor position command signal to the abnormality determining unit 13 of the controller 1.

After the motor control system is started, the abnormality determining unit 13 of the controller 1 monitors the observation signals such as the motor position command signal input from the command generating unit 12 of the controller 1, the detection signal output from the detector 4, and the control signal generated in the motor control device, and determines whether an abnormality has occurred in the motor control system (step S120). While an abnormality is not detected (No in step S120), the abnormality determining unit 13 of the controller 1 continues to monitor the observation signals by repeatedly performing the process of step S120.

On the other hand, when an abnormality is detected (Yes in step S120), the abnormality determining unit 13 of the controller 1 generates and outputs a motor stop signal to the command generating unit 12. The command generating unit 12 outputs the motor stop signal to the control processing unit 22. The occurrence information of the abnormality may be displayed on any one of the display unit 14 of the controller 1 and the display unit 25 of the motor control device 2.

When the motor stop signal is input from the abnormality determining unit 13 of the controller 1, the control processing unit 22 stops the output of the power command signal to stop the driving of the motor 3 (step S130).

Then, the abnormality determining unit 13 of the controller 1 determines the level of repeatability of the detected abnormality. That is, the abnormality determining unit 13 determines whether the detected abnormality is a specific abnormality having high repeatability or an abnormality (abnormality having low repeatability) other than the specific abnormality having high repeatability (step S140).

When the detected abnormality is the specific abnormality having high repeatability (Yes in step S140), the abnormality determining unit 13 of the controller 1 outputs occurrence information of the specific abnormality to the display unit 14 of the controller 1 and the display unit 25 of the motor control device 2 to display the occurrence information (specific alarm display). Accordingly, the occurrence of the abnormality in the motor control system and the details of the abnormality are notified to the operator to call the operator's attention. The display unit 14 of the controller 1 and the display unit 25 of the motor control device 2 transition from the normal display mode to the specific abnormality alarm display mode. An alarm display of all abnormalities is displayed on the display unit 14 of the controller 1 and the display unit 25 of the motor control device 2, but the indication of occurrence of the specific abnormality (specific alarm display) is performed in a manner other than the display of an abnormality having low repeatability other than the specific abnormality. The indication of the occurrence of the specific abnormality is performed, for example, by display of an additional message or colored display of an alarm display. Accordingly, the occurrence of the specific abnormality having high repeatability in the motor control system and the details of the abnormality can be clearly notified to the operator, thereby more effectively calling the operator's attention to a solution to a source which is an underlying cause. The occurrence information of the specific abnormality may be displayed on any one of the display unit 14 of the controller 1 and the display unit 25 of the motor control device 2.

When the detected abnormality is the specific abnormality having high repeatability (Yes in step S140), the abnormality determining unit 13 of the controller 1 generates and outputs occurrence information of the specific abnormality to the command generating unit 12. The command generating unit 12 outputs the occurrence information of the specific abnormality to the control processing unit 22. When the occurrence information of the specific abnormality is input from the abnormality determining unit 13 of the controller 1, the control processing unit 22 transitions from the normal mode to the specific abnormality alarm mode (step S150).

Then, the control processing unit 22 monitors whether the specific abnormality releasing process can be observed, and determines whether the specific abnormality releasing process has been performed (step S160). That is, the control processing unit 22 determines whether an input of the mode transition command signal from the input unit 11 of the controller 1 or the input unit 21 of the motor control device 2 is present. The specific abnormality releasing process is performed by the operator based on the display details on the display unit 14 of the controller 1 and the display unit 25 of the motor control device 2.

When the specific abnormality releasing process is performed on the control processing unit 22, that is, when the mode transition command signal is input to the control processing unit 22 (Yes in step S160), the control processing unit 22 transitions from the specific abnormality alarm mode to the abnormality alarm mode (step S170). When the specific abnormality releasing process is performed on the display unit 14 and the display unit 25, that is, when the mode transition command signal is input to the display unit 14 and the display unit 25, the display unit 14 and the display unit 25 transition from the specific abnormality alarm display mode to the abnormality alarm display mode (step S170).

When it is determined in step S140 that the detected abnormality is not the specific abnormality having high repeatability (No in step S140), the abnormality determining unit 13 of the controller 1 generates and outputs occurrence information of the abnormality to the command generating unit 12. The command generating unit 12 outputs the occurrence information of the abnormality to the control processing unit 22. When the occurrence information of the abnormality is input from the abnormality determining unit 13 of the controller 1, the control processing unit 22 transitions from the normal mode to the abnormality alarm mode (step S170).

When the detected abnormality is not the specific abnormality having high repeatability (No in step S140), the abnormality determining unit 13 of the controller 1 outputs the occurrence information of the abnormality to the display unit 14 of the controller 1 and the display unit 25 of the motor control device 2 so as to display the occurrence information (alarm display). Accordingly, the occurrence of the abnormality in the controller 1 and the details of the abnormality are notified to the operator to call the operator's attention. The display unit 14 of the controller 1 and the display unit 25 of the motor control device 2 transition from the normal display mode to the abnormality alarm display mode.

Thereafter, the alarm state releasing process when an abnormality is detected is performed in the same way as in the first embodiment.

In the second embodiment, similarly to the first embodiment, the motor 3 can be safely and easily stopped until the specific abnormality releasing process is completed. In the motor control system according to the second embodiment, the alarm display on the display unit 14 and the display unit 25 cannot be released until the specific abnormality releasing process is completed.

Accordingly, it is possible to more effectively call the operator's attention when the specific abnormality having high repeatability has occurred and thus to prevent the alarm state release through an easygoing reset process in a state in which the investigation of the cause of the abnormality occurrence has not been completed and a source which is an underlying cause of the abnormality occurrence has not been removed. As a result, it is possible to easily prevent occurrence of the same specific abnormality having high repeatability due to the easygoing reset process, uncontrollable error of machinery due to the specific abnormality, and like.

In the second embodiment, similarly to the first embodiment, when it is determined that an abnormality (abnormality having low repeatability) other than the specific abnormality having high repeatability has occurred, the control processing unit 22 transitions from the normal mode 102 to the normal abnormality alarm mode 103. The transition from the abnormality alarm mode 103 to the normal mode 102 is performed when the reset process is performed.

In the second embodiment, similarly to the first embodiment, the control processing unit can be restored to the normal mode 102 by only the reset process in the case of an abnormality (abnormality having low repeatability) other than the specific abnormality having high repeatability. Accordingly, it is possible to easily perform the restoration process to the normal mode 102 in the case of an abnormality (abnormality having low repeatability) other than the specific abnormality having high repeatability. The display unit can also be restored to the normal display mode by only the reset process in the case of an abnormality (abnormality having low repeatability) other than the specific abnormality having high repeatability. Accordingly, it is possible to easily perform the restoration process to the normal display mode in the case of the abnormality (abnormality having low repeatability) other than the specific abnormality having high repeatability.

As described above, in the second embodiment, it is possible to prevent the easygoing release of the alarm state by an operator in the case of the specific abnormality having high repeatability and thus to prevent the same abnormality from occurring again or sporadically. In the case of an abnormality (abnormality having low repeatability) other than the specific abnormality having high repeatability, it is possible to easily release the alarm state. As a result, according to the second embodiment, similarly to the first embodiment, it is possible to achieve compatibility of calling the operator's attention and maintaining the workability when an abnormality occurs.

INDUSTRIAL APPLICABILITY

As described above, the motor control device according to the present invention is useful for calling an operator's attention at the time of occurrence of an abnormality and maintaining workability to be compatible with each other.

REFERENCE SIGNS LIST

1 CONTROLLER
2 MOTOR CONTROL DEVICE
3 MOTOR
4 DETECTOR
5 POWER SUPPLY
11 INPUT UNIT
12 COMMAND GENERATING UNIT
13 ABNORMALITY DETERMINING UNIT
14 DISPLAY UNIT
15 COMMUNICATION UNIT
21 INPUT UNIT
22 CONTROL PROCESSING UNIT
23 INVERTER UNIT
24 ABNORMALITY DETERMINING UNIT
25 DISPLAY UNIT
26 COMMUNICATION UNIT
101 STOP MODE
102 NORMAL MODE
103 ABNORMALITY ALARM MODE
104 SPECIFIC ABNORMALITY ALARM MODE

The invention claimed is:

1. A motor control device that is connected to a controller and a motor and that controls driving of the motor, the motor control device comprising:
  a control processing unit to control the driving of the motor based on a command signal input from the controller so as to command an operation of the motor and a detection signal which is a detection result of the operation of the motor; and
  an abnormality determining unit to detect an abnormality in the controller, the motor control device, and the motor based on the command signal, the detection signal, and a control signal generated in the motor control device and that determines a level of repeatability of the detected abnormality based on a predetermined criterion,
  wherein, when a specific abnormality determined to have high repeatability according to the predetermined criterion has occurred, the control processing unit transitions from a normal mode in which the driving control of the motor is enabled to a specific abnormality alarm mode in which a control stop state in which the driving control of the motor is stopped is caused and in which releasing of the control stop state is disabled by a reset process, and wherein,
  when a specific abnormality releasing process is performed on the motor control device, the control processing unit transitions from the specific abnormality alarm mode to an abnormality alarm mode in which the control stop state is caused and the releasing of the control stop state is enabled by the reset process.

2. The motor control device according to claim 1, wherein, when an abnormality other than the specific abnormality has occurred, the control processing unit transitions from the normal mode to the abnormality alarm mode.

3. The motor control device according to claim 1, wherein the specific abnormality releasing process is a process of inputting a mode transition command signal for commanding transition from the specific abnormality alarm mode to the abnormality alarm mode to the control processing unit.

4. The motor control device according to claim 3, further comprising a display unit that displays information in the motor control device,
  Wherein, when the specific abnormality has occurred, the display unit transitions from a normal display mode in which normal display is performed to a specific abnormality alarm display mode in which occurrence information of the specific abnormality is displayed and restoration to the normal display mode is disabled by releasing the display of the occurrence information of the specific abnormality by the reset process.

5. The motor control device according to claim 4, wherein, when the specific abnormality releasing process is performed on the motor control device, the display unit transitions from the specific abnormality alarm display mode to an abnormality alarm display mode in which occurrence information of an abnormality other than the specific abnormality is displayed and restoration to the normal display mode is enabled by releasing the display of the occurrence information of the abnormality other than the specific abnormality by the reset process.

6. The motor control device according to claim 5, wherein, when the abnormality other than the specific abnormality has occurred, the display unit transitions from the normal display mode to the abnormality alarm display mode.

7. The motor control device according to claim 5, wherein the specific abnormality releasing process is a process of inputting a mode transition command signal for commanding transition from the specific abnormality alarm display mode to the abnormality alarm display mode to the display unit.

8. A motor control system comprising:
the motor control device according to claim 1;
a motor;
a detector that is connected to the motor and that generates a detection signal which is a detection result of an operation of the motor and inputs the detection signal to the motor control device; and
a controller to generate a control signal for commanding the operation of the motor and inputs the control signal to the motor control device.

9. A motor control device that is connected to a controller and a motor and that controls driving of the motor, the motor control device comprising:
a control processing unit to control the driving of the motor based on a command signal input from the controller so as to command an operation of the motor and a detection signal which is a detection result of the operation of the motor;
an abnormality determining unit to detect an abnormality in the controller, the motor control device, and the motor based on the command signal, the detection signal, and a control signal generated in the motor control device and that determines a level of repeatability of the detected abnormality based on a predetermined criterion; and
a display unit to display information inside the control processing unit;
wherein, when a specific abnormality determined to have high repeatability according to the predetermined criterion has occurred, the control processing unit transitions from a normal mode in which the driving control of the motor is enabled to a specific abnormality alarm mode in which a control stop state in which the driving control of the motor is stopped is caused and in which releasing of the control stop state is disabled by a reset process,
when the specific abnormality has occurred, the display unit transitions from a normal display mode in which normal display is performed to a specific abnormality alarm display mode in which occurrence information of the specific abnormality is displayed and restoration to the normal display mode is disabled by releasing the display of the occurrence information of the specific abnormality by the reset process, and
when the specific abnormality releasing process is performed on the motor control device, the display unit transitions from the specific abnormality alarm display mode to an abnormality alarm display mode in which occurrence information of an abnormality other than the specific abnormality is displayed and restoration to the normal display mode is enabled by releasing the display of the occurrence information of the abnormality other than the specific abnormality by the reset process.

10. The motor control device according to claim 9, wherein, when the abnormality other than the specific abnormality has occurred, the display unit transitions from the normal display mode to the abnormality alarm display mode.

11. The motor control device according to claim 9, wherein the specific abnormality releasing process is a process of inputting a mode transition command signal for commanding transition from the specific abnormality alarm display mode to the abnormality alarm display mode to the display unit.

12. A motor control system comprising:
the motor control device according to claim 9;
a motor;
a detector that is connected to the motor and that generates a detection signal which is a detection result of an operation of the motor and inputs the detection signal to the motor control device; and
a controller to generate a control signal for commanding the operation of the motor and inputs the control signal to the motor control device.

* * * * *